Nov. 6, 1923.

E. J. HUBBARD

SPOOL

Filed April 16, 1923

1,472,980

INVENTOR.
Eber J. Hubbard
BY Charles J. Schmidt
ATTORNEYS.

Patented Nov. 6, 1923.

1,472,980

UNITED STATES PATENT OFFICE.

EBER J. HUBBARD, OF BERWYN, ILLINOIS.

SPOOL.

Application filed April 16, 1923. Serial No. 632,236.

*To all whom it may concern:*

Be it known that I, EBER J. HUBBARD, a citizen of the United States, and a resident of Berwyn, in the county of Cook and State of Illinois, have invented certain new and useful Improvements in Spools, of which the following is a specification.

My invention relates to spools or reels constructed of sheet metal and adapted particularly for holding material such as wire.

The object of my invention is to provide construction and arrangement which will enable the various parts to be accurately inter-connected and secured together to form a strong rigid and durable structure.

On the accompanying drawing, I show a spool in which the various features of my invention are incorporated. On this drawing—

Figure 1:
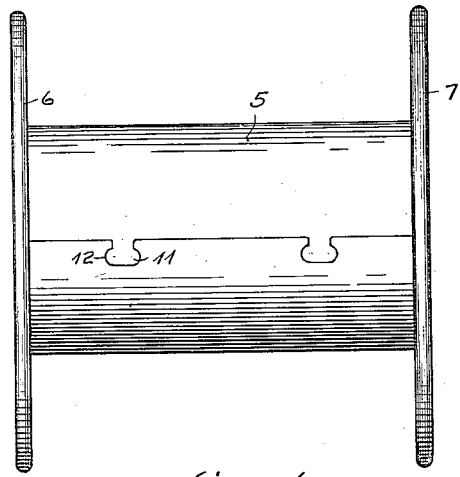
Fig. 1 is a side elevational view.
Figure 2:
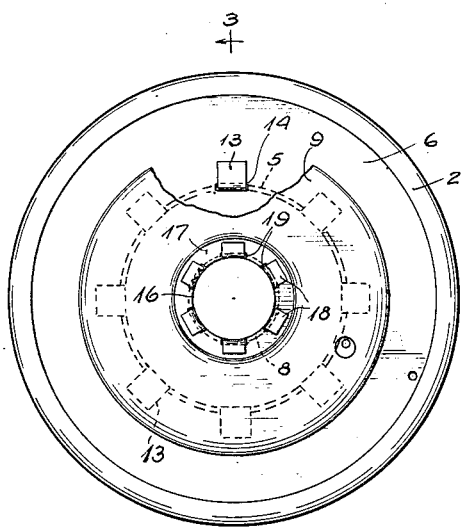
Fig. 2 is an end view with parts broken away.
Figure 3:
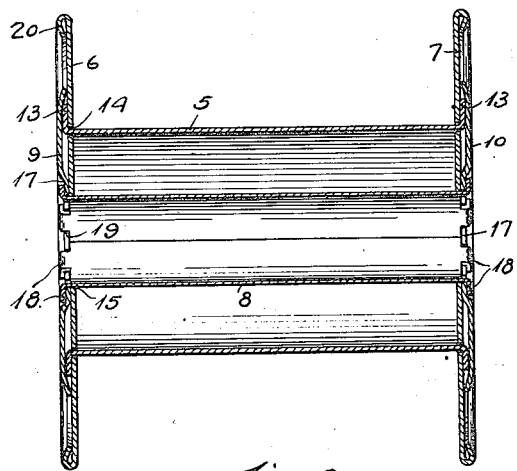
Fig. 3 is a sectional view on plane 3—3, Fig. 2.

The spool comprises the hub or core 5, the flange ends 6 and 7, the spindle tube 8 and the plates 9 and 10. The core is formed by bending a rectangular piece of sheet metal into cylindrical form and interlocking the abutting edges by means of dove-tail tongues 11 engaging in the notches 12 as disclosed in my Patent No. 1,143,541 dated June 15, 1915. The hub is secured to the flange ends 6 and 7 by means of tongues 13 which extend through the slots 14 in the flange ends and are bent outward radially to lie against the outside of the flange ends. The plates 9 and 10 are concentric with the flange ends and near their edges the plates overlie the tongues 13, the plates, tongues and flange ends being rigidly secured together by spot welding.

The spindle tube 8 is also preferably formed by rolling up a piece of sheet metal to cylindrical form. The flange ends 6 and 7 have the axial openings 15 whose diameter is such as to receive the ends of the spindle tube. The plates 9 and 10 have the axial openings 16 whose diameter is substantially equal to the inner diameter of the spindle tube, the spindle tube at its ends thus extending through the openings in the flange ends and abutting against the plates 9 and 10 adjacent their openings 16. Adjacent their outer edges the plates 9 and 10 are deflected inwardly to engage against the flange ends 6 and 7, and at their inner edges the plates are depressed as indicated at 17 in order to engage with and seat against the flange ends. At its ends the spindle tube has the tongues 18, and to receive these tongues the plates 9 and 10 at their openings 16 are provided with slots 19 whose depth is equal to the thickness of the tongues. After the parts are assembled these tongues are deflected outwardly and radially to abut against the plates 9 and 10 in the depressed section 17 thereof. As the flange ends, hub, and the plates are securely welded together, and the spindle tube tongues are anchored in the slots of the plates and abut against the outside of the plates, the spindle tube is securely and rigidly anchored in place, and such rigid anchorage of the spindle tube assists materially in holding the spool end wall structures in place and strengthening them. At the same time the bore of the spindle tube is entirely smooth so that the spool can readily turn on a supporting spindle or other holder.

The spool end wall structures are further strengthened by curling the peripheral section of the flange ends 6 and 7 outwardly and downwardly as indicated at 20. The thickness of this curled edge is such that the outer faces of the plates 9 and 10 will be coincident with or within the outer surface of the curled edges, and the tongues 18 of the spindle tube are within the outer faces of the plates so that the spool can seat flatly and securely on its ends or on spindle supports. The plates 9 and 10 present smooth outer surfaces which offer very little resistance to turning of the spools during unwinding thereof.

I thus produce a simple, strong, durable and efficient spool capable of withstanding the wear and tear to which it will be subjected. The spindle tube cannot work loose because of its secure anchorage both against longitudinal and rotational displacement.

Having described my invention, I claim as follows:

1. In a sheet metal spool, the combination of a cylindrical core, flange ends having openings, the ends of said core extending through said openings and being turned over against the outer faces of said flange ends, plates applied against the outer sides of said flange ends, said core ends being welded to said flange ends and plates, said flange ends and plates having axial openings, and a spindle tube extending axially through said core and through said openings and having its ends turned over against the outer faces of said plates.

2. In a sheet metal spool, the combination of a cylindrical core, flange ends secured to said core, plates concentric with said flange ends and secured against the outer faces thereof, said plates having axial openings, a spindle tube extending through said core, tongues at the ends of said tube, said plates having notches at their openings, said tongues extending through said notches and being deflected against the outer faces of said plates whereby said tube will be anchored against longitudinal and rotational displacement.

3. In a sheet metal spool, the combination of a hub having tongues at its ends, flange ends having openings for receiving said tongues, said tongues being deflected radially to engage against the outer faces of said ends, plates concentric with said ends and overlying said tongues, said tongues being welded to said ends and plates, said plates having axial openings and having passageways adjacent said openings, a spindle tube extending through said hub, and tongues at the ends of said spindle tube extending through said passageways and deflected radially against the outer faces of said plates, whereby said tube will be anchored against longitudinal and rotational displacement.

4. In a sheet metal spool, the combination of a cylindrical hub, flange ends for said hub, plates concentric with said ends and applied against the outer faces thereof, said plates, hub and ends being welded together, said plates having axial openings and having notches extending radially from said openings, a spindle tube extending through said hub and abutting at its ends against said plates, and tongues at the ends of said tube extending through said notches and deflected radially against the outer faces of said plates.

5. In a sheet metal spool, the combination of a cylindrical hub, flange ends secured to the ends of said hub, plates concentric with said ends and secured against the outer faces thereof, said plates having axial openings and notches extending radially from said openings, a spindle tube extending through said hub, and tongues at the ends of said spindle tube extending through said notches and being deflected against the outer faces of said plates, said plates having annular depressions around their openings for receiving said tongues and whereby said tongues will be within the planes of the outer faces of said plates.

6. In a sheet metal spool, the combination of a cylindrical hub, flange ends secured to said hub, plates concentric with said flange ends and secured against the outer faces thereof, a spindle tube extending through said hub, said flange ends having axial openings, said spindle tube extending through said openings and abutting against said plates, said plates having openings registering with the bore of said tube, said plates having notches extending from their openings, and tongues at the ends of said tube extending through said notches and deflected radially to abut against the outer faces of said plates, said plates being depressed to bring said tongues within the planes of the outer faces of said plates.

7. In a sheet metal spool, the combination of a cylindrical hub, end wall structures secured to said hub and having axial openings, there being notches extending radially from said openings, a spindle tube extending through said hub, and tongues at the ends of said spindle tube extending through said notches and deflected radially to abut against the outer faces of said end wall structures.

In witness whereof, I hereunto subscribe my name this 10th day of April, A. D., 1920.

EBER J. HUBBARD.